United States Patent [19]

Langenegger et al.

[11] 4,394,847
[45] Jul. 26, 1983

[54] UNIT FOR THE ADMINISTRATION OF LIQUIDS TO ANIMALS, MORE SPECIALLY A WATERING BOWL

[76] Inventors: Georg Langenegger, Bachstr. 10; Franz Bauer, Unterer Graben 2, both of D-8050 Freising; Josef Langenegger, Deutschherrenstr. 10, D-8891 Petersdorf, all of Fed. Rep. of Germany

[21] Appl. No.: 290,961

[22] Filed: Aug. 7, 1981

[30] Foreign Application Priority Data

Aug. 14, 1980 [DE] Fed. Rep. of Germany ....... 3030758

[51] Int. Cl.³ .................. A01K 7/02; A01K 7/04; A01K 7/06; F16K 7/17
[52] U.S. Cl. ........................ 119/75; 119/78; 119/81; 137/414; 251/45
[58] Field of Search ............ 119/75, 81, 78; 251/45; 137/414

[56] References Cited

U.S. PATENT DOCUMENTS

| 2,606,572 | 8/1952 | Arnold | 251/45 X |
|---|---|---|---|
| 3,058,485 | 10/1962 | McQueen | 137/414 |
| 3,110,469 | 11/1963 | Becker | 251/45 |
| 3,145,728 | 8/1964 | Sterrett et al. | 137/414 |
| 3,176,707 | 4/1965 | Wilson | 137/315 |
| 3,264,888 | 8/1966 | Alburger | 119/81 X |
| 3,385,316 | 5/1968 | Couffer, Jr. | 137/414 |
| 3,405,686 | 10/1968 | Hart | 119/75 |
| 3,586,017 | 6/1971 | Walters | 137/59 |
| 3,763,881 | 10/1973 | Jones | 251/45 X |

FOREIGN PATENT DOCUMENTS

| 218933 | 6/1907 | Fed. Rep. of Germany . |
|---|---|---|
| 1161458 | 2/1961 | Fed. Rep. of Germany . |
| 1153582 | 8/1963 | Fed. Rep. of Germany . |
| 1607200 | 6/1970 | Fed. Rep. of Germany . |
| 1306380 | 9/1974 | Fed. Rep. of Germany . |
| 2626612 | 1/1977 | Fed. Rep. of Germany . |
| 2267020 | 4/1974 | France . |
| 516112 | 1/1972 | Switzerland . |
| 1230171 | 4/1971 | United Kingdom . |

*Primary Examiner*—Hugh R. Chamblee
*Attorney, Agent, or Firm*—Karl F. Ross; Herbert Dubno

[57] ABSTRACT

For controlling the rate of supply of water to a watering bowl, a diaphragm valve with a diaphragm is placed in the water connection system, one side of the diaphragm resting against a barrel-like part, the space within the barrel being joined up, for example, with the bowl while the space round the barrel on the same side of the diaphragm is joined up with the water inlet so that, when the diaphragm is moved clear of the end of the barrel, water may make its way from the inlet into the bowl. On the opposite side of the valve diaphragm there is a pilot control space into which water may make its way through a small hole in the diaphragm and out of the pilot control space into the bowl through a pilot valve system in the form of an opening and a moving pilot valve which is worked by a lever or the like in the bowl, by a float or by a pilot diaphragm acted upon by the liquid level in the bowl. When the pilot valve is shut, water will slowly make its way into the pilot control space so that the pressure therein goes up to the pressure of water let into the space on the other side of the diaphragm with the outcome that the diaphragm is sealingly pressed against the end of the barrel. If the pilot valve is moved clear of the pilot outlet, the head of water in the pilot control space at once goes down to the pressure in the bowl so that the valve diaphragm is moved clear of the end of the barrel and a large valve opening produced so that the bowl is quickly filled up even with a low water input head, while the force needed for working the pilot valve is small, even if the head of the input water is at a high value.

13 Claims, 16 Drawing Figures

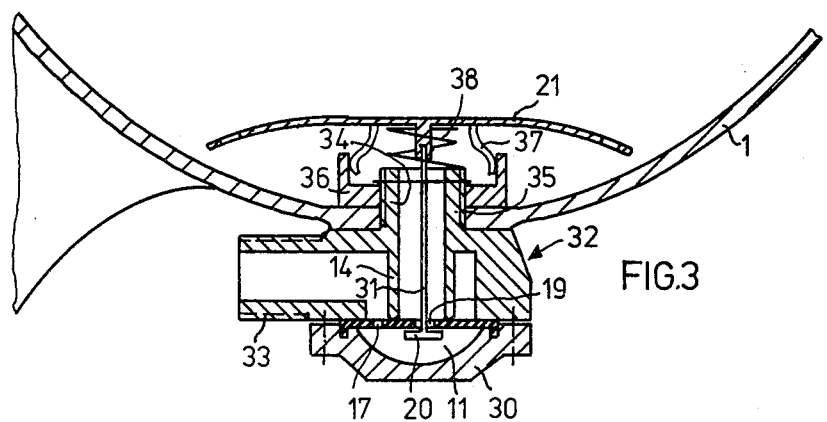
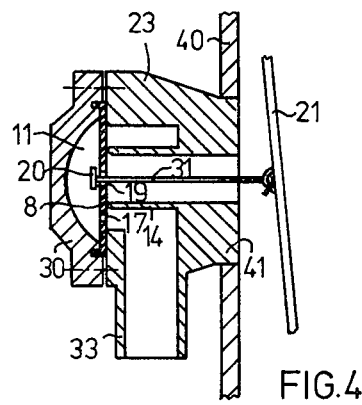
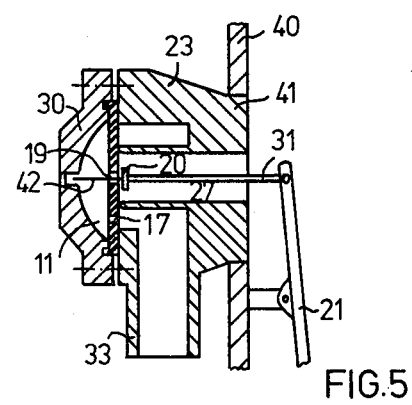
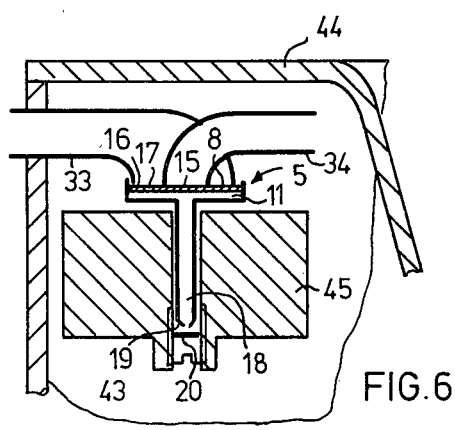
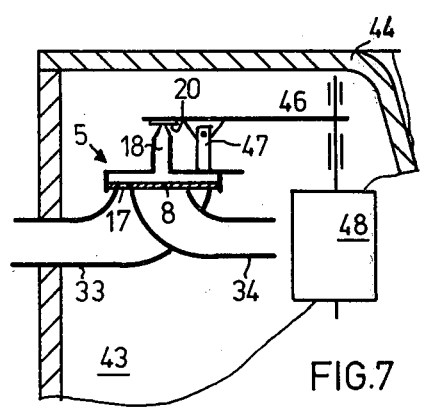

UNIT FOR THE ADMINISTRATION OF LIQUIDS TO ANIMALS, MORE SPECIALLY A WATERING BOWL

FIELD OF THE INVENTION

The present invention relates to a livestock watering unit having a bowl, a water control valve and pilot valve for controlling the inlet of water to the bowl by way of an inlet duct. Although the invention is more specially addressed waterers for farm animals, it will be clear that my watering apparatus may also be used for the administration of liquid feeds taken in by the livestock by drinking.

BACKGROUND OF THE INVENTION

For watering stall and grazing animals, different sorts of automatic drinking bowls have come into use. In some, a valve is normally worked by the animal pushing against a release such as a lever or the like, as for example a lever bar or loop of metal placed within the bowl. However, such prior art bowls have shortcomings, especially for watering different sorts of animals from a single bowl. In fact, about 25 liters of water a minute are needed for watering each head of cattle so that the valve design has to be such that the valve is opened wide, and if the valve is to be opened by the force of the animal itself, a high degree of force is necessary. On the other hand, young stock will have trouble on using such valves and the natural drinking and swallowing will be hard if the animal has to keep working, or only working between gulps, some special valve system.

The same sort of problems are likely to arise in the case of automatic watering apparatus functioning without a bowl and simply in the form of a rubber disk fixed at the end of a water pipe and kept pressed elastically, because of its own elastic properties, against a ring-like lip so that the disk may be moved by a push rod which has to be displaced by the animal itself, so that, when the rod is pushed or turned, the rubber disk is so moved out of position that the water may make its way out past the ring-like lip and the rod (see German Offenlegungsschrift No. 2,306,280).

For decreasing the amount of force necessary for working a bowl valve, a suggestion has been in German Offenlegungsschrift No. 2,626,612 to make use of a watering valve with a cylindrical housing, which is joined with one end of the water pipe and which has a driving button sticking out of its upwardly running top end, the button being responsible for operating a small pilot plug of a plug-valve against the normal water pressure in a hollow valve cone, the plug being so freed of pressure so that, by pushing on the driving button further, it may be moved into the opened position.

Using such a system, it is true that the force needed right at the start for working the valve may be greatly decreased, but the degree to which the valve may be opened, that is to say the cross-section which is unblocked, is still limited so that, in the case of watering systems for grazing animals in which a water head of frequently only 200 to 300 millimeters is available, very large valve sizes have to be used so that, because such valves are made of metal, the price is high.

OBJECTS OF THE INVENTION

Taking as a starting point a stock watering unit having a bowl, a self-acting valve and pilot valve for controlling the inlet of water to the bowl by way of an inlet duct, one object of the invention is to provide such a watering unit that is as simple and as trouble-free in operation as possible.

A further object of the present invention is to provide a stock watering unit that even when run with very low water pressures, the valve may be opened very wide even when worked by feeble animals.

A further object of the present invention is to provide such a watering unit which makes possible a very high watering rate.

Still another object of the invention is to provide improved pilot valve control systems.

SUMMARY OF THE INVENTION

For effecting these and other purposes, a stock watering bowl unit of the invention has a diaphragm valve, whose diaphragm is gripped at its edge in a valve housing and whose one side is placed resting against a barrel having the function of separating a water inlet from an outlet running into the bowl e.g. because of the diaphragm's resting against the end of the barrel, while the other side of the diaphragm has the function of walling off a pilot control space, whose pressure may be changed by a pilot control system.

Diaphragm valves of the right design for such a system are known as such and have been used for a great number of years, for example in washing machines and a great number of different sizes are mass produced and marketed at a low price. They are generally trouble-free in operation and make it possible for high water inlet rates to be controlled using a very small force for putting the valve into operation, that is to say they may be readily designed for use with the watering rates desired. Such diaphragm valves may generally be used in any position as for example upside-down or on the side. A release, that is to say the lever or the like in the bowl, does not have to be placed in any special position, because there are a great number of different ways of changing the pressure in the pilot control space and such control may, generally speaking, be purely mechanical by forcing or displacing into the pilot control space by a pneumatic or hydraulic system, or by a linkage or transmission such as bowden cables, pressure lines or the like using a small cylinder or bellows unit.

A specially good effect is produced by so designing the system that water is let into said pilot control space from the inlet space on the other side of the diaphragm and out of the control space by way of the pilot valve, which is designed as a choke valve. This system for letting water through the pilot control space, and which is only used for pilot control purposes, that is to say for changing the pressure in the pilot control space, may have a very narrow cross-section. The pilot control valve having a choking effect when it is between its open and shut positions, is completely shut in one end position. The further motion of the control fluid, that is to say the water, is unimportant for the function of the valve, it making its way into the main outlet or the bowl.

The pilot control valve or controller will generally be placed downstream from the pilot control space and may, generally speaking, be placed at any desired point along an outlet pipe, which may be long. It is best for it to be placed at an outlet of the pilot control space, although, however, by using a connection pipe, this outlet may be placed at some distance from the bowl and may be placed at any desired angle in relation to the bowl and the valve.

Furthermore, on the inlet side or the pressure side, the duct for the water may be in a great number of different designs as may be desired. Because, however, the inlet connection and the pilot control space are only separated from each other by the diaphragm, the duct for the control fluid or water is to be let go through at least one opening in the valve diaphragm, the shortest path then being if in the two areas, which are centered on a common point, of the inlet connection and the bowl connection there is an opening. The pilot driving part may then be used for one of these openings, more specially the one in the middle of the diaphragm.

In the case of such a design, the pilot driving part is best a driving rod, guided for motion in its length-direction and placed in the middle of one diaphragm opening or hole. This rod need not be sealed in the diaphragm if the bowl connection or outlet goes straight into the bowl itself. However, even in cases in which the rod goes through a wall of the pilot control space into the bowl or into a space joined therewith, it is nearly always possible to do without any sealing systems.

If the pilot driving part is guided so that it may be moved along a completely straight line, it may have any desired form. In the case of some release or triggering systems it may, however, be best for the pilot driving part to have a valve plate which may be changed in its angle in relation to the structure with the outlet opening. This valve plate will then have one edge resting against the edge of the outlet opening all the time and will be rocked in relation to the same.

In the case of simple designs of the invention, the pilot driving part will take the form of a release to be worked by the animal, as for example a release in the form of a lever, a curved bar, a button or the like. Presently preferred is a system in which the pilot control system is worked by the liquid level in the bowl, it being possible to have a system as well, if desired, for changing the effect produced by a change in level so that the level of the water will be different, this being to take into account the different behavior of animals on being watered.

In the case of one working example of the invention, the pilot driving part is in the form of a float which is in a vessel which, from the point of view of the water level, is joined up with the bowl or the rest of the bowl. This float vessel may, generally speaking, be part of the inner space of the bowl if it is guarded by netting, a wall or a sieve so that it is not damaged from the outside.

As part of a further suggestion of the present invention, the pilot control force is produced by the water pressure on the floor of the bowl which, in this case, in a simple way, will be caused to take effect, for example, on the pilot valve diaphragm, acted upon by the head of water in the bowl, for operation of the pilot driving system. The pilot valve diaphragm may naturally be mechanically separated from the space of the bowl and so guarded against damage, although it may itself form a part of the floor of the bowl. In this case, it is best to have a netting guard or the like covering over the diaphragm.

By changing loads or weights acting on the diaphragm or on a float, it is possible for such a diaphragm or float to take effect at a different level, so that the water level in the bowl is kept at a different height as may be desired. The further weight or force may, in a very simple design, be produced by a number of different weights which may be put in as desired or by a spring, which is supported at an adjustable point for changing the condition at which the spring is moved and the valve worked.

While in the case of a float and a diaphragm, it is generally not necessary to have such a further way of adjustment, if the bowl is to be able to be rocked in relation to a support part, it is necessary to have a system such as a counter-weight or a return spring for balancing the weight of the bowl and, in this case, the counter-weight or the return spring may itself be adjustable to undertake the further function of adjustment of the valve operation water level. In all three cases, it is possible to make a change in the path from the release part to the valve driving part by putting spacers or the like inbetween so that the valve operation point or level is changed in position and the bowl may be run with different liquid levels.

Furthermore, a useful effect is produced if the diaphragm valve is placed on a support part of the bowl and joined up by way of a control line with the choke valve placed at some distance on the bowl.

In a specially simple form of the system, one valve unit with a diaphragm valve and a pilot control system, may be placed on a connection face having at least one opening so that it may be taken therefrom, the pilot control system being more specially designed so that it may be used with a mechanical or automatic release. The complete control unit and the water inlet are then simply produced by screwing on the valve.

As part of a further working example of the invention, the valve diaphragm and the pilot valve diaphragm may be covered up by a single cover on the bowl and, for example, the two diaphragms may be placed side by side in a common plane between the cover and the bowl although, however, it is furthermore possible for the valve diaphragm and the pilot valve diaphragm to be placed parallel to each other and to be centered on a common line normal thereto.

A further useful effect is produced if the connection face for the valve unit is at the back wall of the bowl because at this position it may be well screened off from the outside by a fixing plate and from the inner space of the bowl by a separating wall.

At the top edge of the connection face or opening, it is possible to have an inlet pipe connection or an inlet pipe molded into the body of the bowl. The liquid will then, in every case, make its way downwards straightway to a diaphragm valve which is best placed at the top, while the diaphragm of the pilot valve is best placed further down to get a more regular control function. At all positions where the valve diaphragm is turned towards the bowl, the barrel, resting against the valve diaphragm, is best made in one piece with the bowl body so that, in most cases, one may make do without special machining.

A spring system for having an effect on the properties of the valve operation is made up of at least one spring functioning as a sort of toggle lever so that the returning force produced by it becomes smaller on an increase in the motion of the pilot valve diaphragm out of its resting position, this giving a "positive" or "defined" switching effect so that the water level would be more regular because the forces acting on the pilot system are more different.

A further way of making certain of a regular water level is by using a power transmission or linkage as for example a lever, placed between the pilot valve diaphragm and the pilot system, such a lever again being used with the spring with a toggle function.

As a further part of the present invention, it is possible for the side of the pilot diaphragm, which is opposite to its wet side, to be in a dry space joined up with the atmosphere, more specially by way of an air filter. This space to the back of the pilot diaphragm then has the effect of mechanically screening the same and making it more trouble-free because of the use of the air filter, which has the function of stopping any dirt or the like making its way into the dry space to the back of the diaphragm without stopping motion of air into and out of this space.

In many cases, a useful effect is produced if a flexible seal is placed between the pilot diaphragm and the outlet of the pilot control system, such seal being a bellows placed only round a limited face of a diaphragm. If, however, the transmission of force takes place through the back space joined up with the atmosphere, it is best to have a design using a sealing diaphragm shutting off the space from the outside.

All the systems and design points used in connection with the pilot control of the diaphragm valve may be used with good effect simply for watering systems for small animals with a control valve placed in the water pipe running to the bowl, in which respect it is best for the pilot diaphragm to be used as such for operation of the control valve and the last-named may have the form of a pilot control valve for the diaphragm valve. In this way parts designed for one given purpose may be used for a further purpose as well, such parts for example being the connection parts such as levers, toggle levers, springs, sealing diaphragms and the like between the pilot diaphragm and the control valve.

BRIEF DESCRIPTION OF THE DRAWING

In the diagrammatic drawing:

FIG. 3 is a view of a system in which a diaphragm valve is placed at the floor of the bowl.

FIGS. 4 and 5 are views of changed forms of the design to specific description.

FIGS. 6 and 7 are views of two diaphragm valves controlled by a float.

FIG. 15 is a view of a valve unit on the same lines as FIG. 13 for watering small animals with a control valve on the same lines as a pilot valve as in FIG. 13.

DETAILED ACCOUNT OF WORKING EXAMPLES OF THE INVENTION

Figure 1:
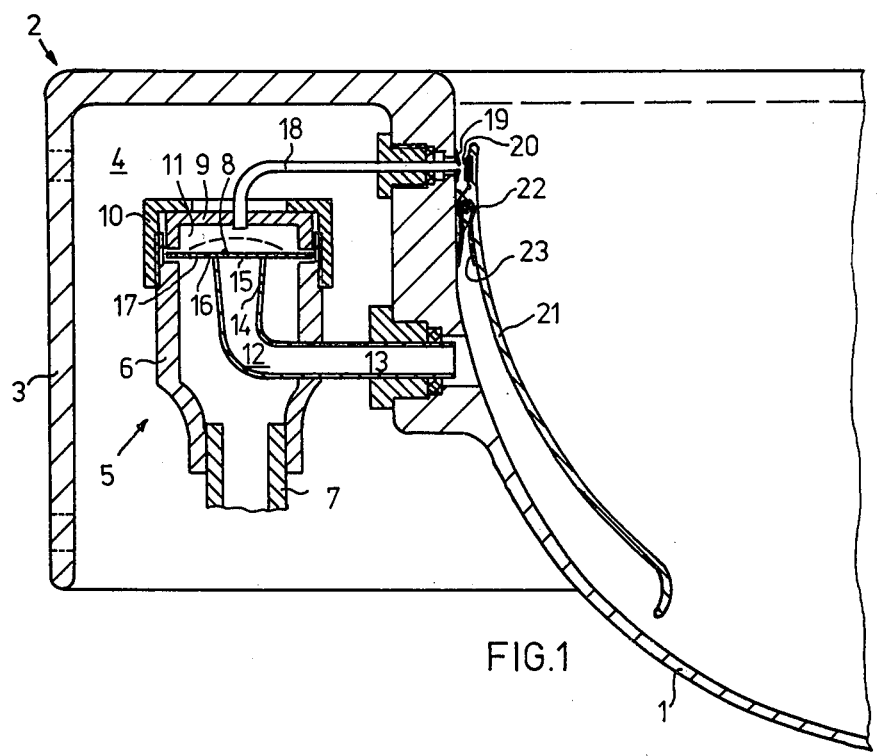
FIG. 1 is an upright section through a watering bowl unit of my invention with the diaphragm valve placed at the back.

In the case of the watering bowl unit to be seen in FIG. 1, the bowl 1 takes the form of a single-piece molding which, on its back side, has a reinforced, box-like support part 2, whose flat back wall 3 may be fixed by screws to a wall, a stanchion or the like. A housing space 4, walled in by support part 2, is only open downwards and has a diaphragm valve 5 placed therein, whose valve body 6 is joined with the top end of a water pipe 7. At the top edge of valve body 6, the edge of a valve diaphragm 8 is gripped by way of a cover 9 which is forced downwards by a union nut 10 so that the diaphragm is sealed at its edge with respect to body 6. Between diaphragm 8 and cover 9, a pilot control space 11 is formed covering nearly the full size of the diaphragm.

In the valve body 6 an elbow-like connection line or pipe 12, 13 is placed running through a nut with a gasket in the wall of the bowl, pipe 12 itself coming to an end and opening into the bowl 1, while the inner, other end of pipe 12 takes the form of a cylindrical barrel 14 having a common center with valve diaphragm 8, the top edge of the barrel having the diaphragm resting against it in the shut down condition of the diaphragm. The barrel takes the form of a wall separating a round inner face or area 15 from a ring-like outer face or area 16, which has a common center with face 15. The inner face 15 is the top wall of a space whose sides are walled in by connection pipe 12, while the outer face 16 takes the form of the top wall of a pressure connection or space joined up with water pipe 7. This space joined up with the input water through pipe 7 is joined up with the pilot control space 11 by way of a narrow hole 17 in the diaphragm. It will be clear to the reader that the two connections, that is to say pipe 12 and pipe 7 might be changed over (if pipe 7 were run into the bowl and pipe 12 were joined up with a water pipe) without the function of the valve being changed.

An outlet pipe 18 will be seen running from the pilot control space 11 fluid-tightly through cover 9 and then running liquid-tightly through the top edge part of the bowl. An outlet 19, which may be in the form of a separate outlet part of metal, synthetic resin or rubber, with a very much greater cross-section than opening or hole 17 (and joined up with outlet pipe 18) is opposite to a pilot part 20 or pilot controller, which takes the form of a choke plate at the end of a short lever arm of a release or trigger 21 able to be rocked about a horizontal turnpin 22 between its two ends and springingly pushed by a hairpin spring 23 in a counter-clockwise direction so that normally the pilot valve 20 is shuttingly forced against outlet 19 with the outcome that the pilot control space 11 is liquid-tightly shut off.

The pressure in the shut-off pilot control space 11 will have the same value as the water inlet pressure in pipe 7 and acting on the smaller outer face 16 of the diaphragm 8 while the pressure acting on the inner face 15 is very much smaller and, in fact, will be generally equal to atmospheric pressure. Because of the greater force, acting in and from the pilot control space 11, the diaphragm is forced liquid-tightly against the end face or top end of barrel 14. On, however, an animal desiring to get water from the bowl and pushing against the release 21 or trigger, even with a very small force, the general outcome will be that, even when the top end of the release is not covered over so that it may be touched by the animal, the release will be turned in a clockwise direction so that the outlet 19 will be uncovered or opened and the pressure in the pilot control space 11 will go down, more or less at once, to the atmospheric pressure and the valve diaphragm 8 will be bent and curved upwards because of the inlet water pressure acting on the outer face 16 and forced into the pilot control space till it gets to a position as marked in chained lines.

The curve, and, for this reason, the opening motion of the diaphragm is dependent on the material and design of the diaphragm so that such opening motion may be changed by changing over the diaphragm of the valve for a given pressure. Because the valve motion takes place all round the top edge of the barrel 14, it is at once possible for water to make its way over the edge of the barrel inwards and through the connection pipe 12 into the bowl 1 till, after shutting off the outlet 19, the necessary balancing pressure is being produced in the pilot control space because of water making its way through opening 17 so that the diaphragm valve is shut again. However, it is only necessary for release or trigger 21 to be lightly touched by the animal for water to be forced at a high rate, that is to say at the desired speed, into the bowl. The valve opening cross-sections may, in this respect, be readily so designed that, even in the case of a water head of only about 200 mm, the desired water rate of for example 25 liters a minute, may be produced.

Figure 2:
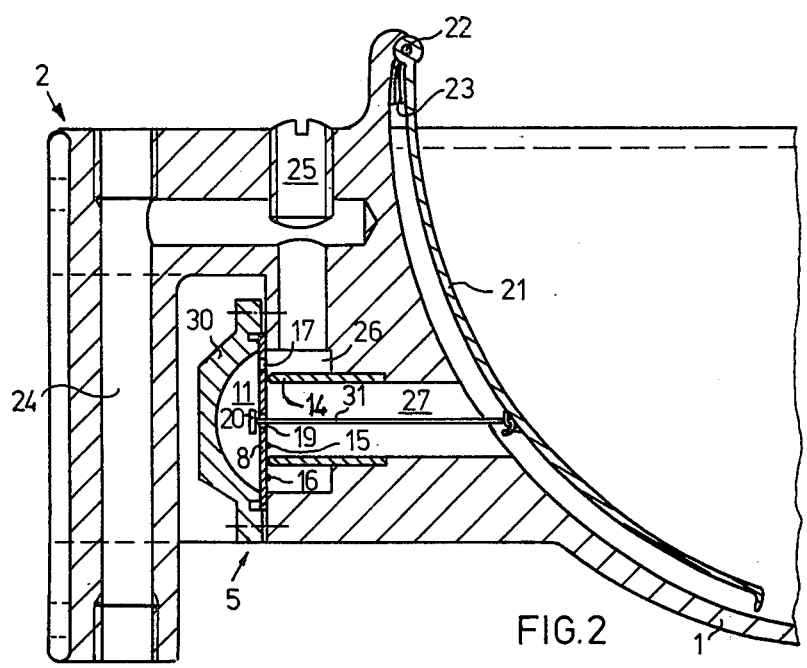
FIG. 2 is a somewhat changed form of the unit of FIG. 1.

In FIG. 2, in which the diaphragm valve is placed within the support part of the bowl, to the back side of the support part 2, there is an upright hole 24, whose two ends are screw-threaded so that one end or the other may be joined with an inlet pipe while the other is shut off by a screw-threaded stopper such as 25, which in the present example of the invention may furthermore take the form of a choke if the stopper is screwed down further into a connection hole running to the outer edge of the downwardly running hole 26 produced by molding in support part 2. Hole 26 is joined up with an inlet connection 27 within which the barrel 14 is placed. The edge of the valve diaphragm 8 is, in this case, fixed tightly in position by a shell-like cover 30 within which there is a dome-like pilot control space 11. Outlet 19 takes the form of a hole in the middle of the diaphragm and the pilot valve 20 is at the left hand free end of a rod 31 which may be moved along its lengthdirection in this hole (outlet 19), rod 31 running along the connection line 27 into the inside of the bowl, in which it is joined up with the release or trigger 21 which, in this case, is in the form of a third class lever.

A valve on generally the same lines is to be seen in FIG. 3, in which case, however, a separate valve housing 32 is used having a barrel 14 formed in one piece with the housing 32, and two connections 33 and 34 which are at a right angle to each other. While the horizontally outwardly running connection 33 is used for the inlet of water, the connection 34 running into the bowl is placed through a hole 35 in the floor of the bowl 1 and is fixed tight in it by a plate nut 36. Rod 31 has its top end joined up with a plate-like release, having one or more guide parts 37 under it for guiding it in relation to the plate nut 36, a helical compression spring 38 being placed between nut 36 and release 31; the spring keeps the pilot valve 20 normally against outlet 19 so that the valve is shut off liquid-tightly. A light force on the plate-like release 21 is all that is necessary for opening the valve so that the water makes its way in the middle in an upward direction past the edge of release 21.

This design of the invention makes necessary the least changes in the bowl itself and may be fixed in the bowl specially simply and quickly and the inlet opening into the bowl is covered over by the release, which, when the valve is opened, has a current of moving water all round it. In this respect it is naturally possible to have a further connection running into the bowl so that the inlet connection may be upright or horizontal as may be desired. The connection may be designed so that it may be shut.

FIG. 4 is firstly a view of a valve on the same lines as that of FIG. 3 on an upright side wall 40 of bowl 1 and in this case the valve may be fixed in position, generally speaking, by a screw system as in FIG. 3 or the valve may, at least in part, be made in a single piece with the bowl. In the present working example a short male part 41 is taken up in a hole in the side wall and it may be fixed in position, if necessary, by using a flanged cover. Release 21 is again, on the same lines as in FIG. 2, in the form of a lever with a turnpin at one end and with a spring pushing it into the bowl and away from the bowl wall.

In FIG. 5, the release or trigger 21 again has the form of a lever with a turnpin somewhere near its middle and the pilot valve 20 is placed at some distance from the end of rod 31 and within the connection 27 between the valve and the bowl, rod 31 having a needle-like tailpiece 42 running into and through the outlet 19 which takes the form of a hole in the middle of the diaphragm.

In FIG. 6 it will be seen that at the side, that is to say the back side, there is a valve space 43 which is shut off at its lower end and which may be shut off at its top end by an angled cover 44, which is to be fixed in position. In the top part of the valve space 43, there are two connections 33, 34 which are elbowed so as to be running out in opposite directions horizontally and under lower ends of such connections 33, 34 the diaphragm of the valve is placed; the pilot control space 11 (which, in this case is under the diaphragm) is joined up by way of a pipe-like connection 18 with an outlet 19 at the lower end thereof. Pipe 18 is placed in the hole in the middle of a float 45. The pilot control valve 20 is, in this case, the lower end of the threaded pin screwed into the middle hole in the float. While the connection 33 is run through the outer wall of the bowl and is joined up with the water inlet pipe, the water for drinking coming from the connection 34 is able to make its way straightway into the bowl. Because of the float control, the liquid level in the watering bowl is kept at a regular height within certain tolerances, for which the valve is controlling.

A further working example of the invention using a float control is to be seen in FIG. 7, in which the diaphragm valve 5 is, in relation to the system of FIG. 6, turned upside-down, it having a short outlet connection 18 pointing upwards. In this case, the pilot valve 20 is again at one end of a lever 46 which has a horizontal turnpin 47 between its ends. The other end of the lever is joined up in some way or other with a float 48 which furthermore may have a separate guide system in the bowl.

Figure 8:
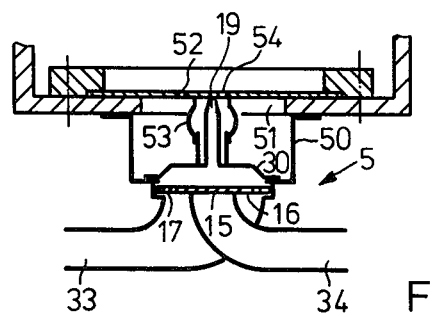
FIG. 8 is a view of a system in which a diaphragm valve is controlled by a pilot diaphragm placed at the floor of the bowl.

The diaphragm valve 5, (of generally the same design and turned in the same direction) of FIG. 8 is fixed under an opening 51 in the floor of the bowl (or an other space joined therewith) by way of a support 50, the space within it being open to the outside. The floor opening 51 is covered over by a pilot valve diaphragm or pilot diaphragm 52 and the outlet connection 18 has a bellows 53 of generally small size placed therearound, the edges of bellows 53 resting sealingly against the pilot diaphragm 52 and the cover 30 of the diaphragm valve. The space within this bellows 53 is, again, joined up by way of a hole or opening 54 with the space above the pilot diaphragm and, for this reason, with the bowl. Bellows 53 may furthermore be made in one piece with the diaphragm 52.

Round and over the bellows, the pilot diaphragm is acted upon by the liquid head or liquid level thereover. The pilot diaphragm may, itself, be used as a pilot driving part such as a rod or it may have such a part which will be placed within the bellows. At any rate, the outlet 19 is completely shut off at a given liquid level or head and is opened again when the liquid level in the bowl has gone down.

This is furthermore true for the design of FIG. 8 in which only the outlet 19 at the end of the outlet connection 18 and the bellows 53 are at the pilot diaphragm 52, while the diaphragm valve 5 is placed at the side at the lower part of a bowl foot 55. In this case, a horizontal connection 27 will be seen opening into the floor at 51, where it is covered over by plate 56 with holes in it. Pilot diaphragm 52 is placed at the lower end of the bowl and gripped in position by a bell 57, in whose lower end part a rod 58 or the like is placed which may, if desired, be vertically adjusted, the top end of the pin having the outlet 19 and the lower end of the bellows 53. The space shut in within this bellows is joined up by way of a pipe 60 with the connection 27 running into the bowl and, for this reason, is joined up with the bowl itself. In this case, there is no hole 54 through the pilot diaphragm itself, but on the lower face of the diaphragm there is a separate plate-like pilot valve 20.

Figure 10:
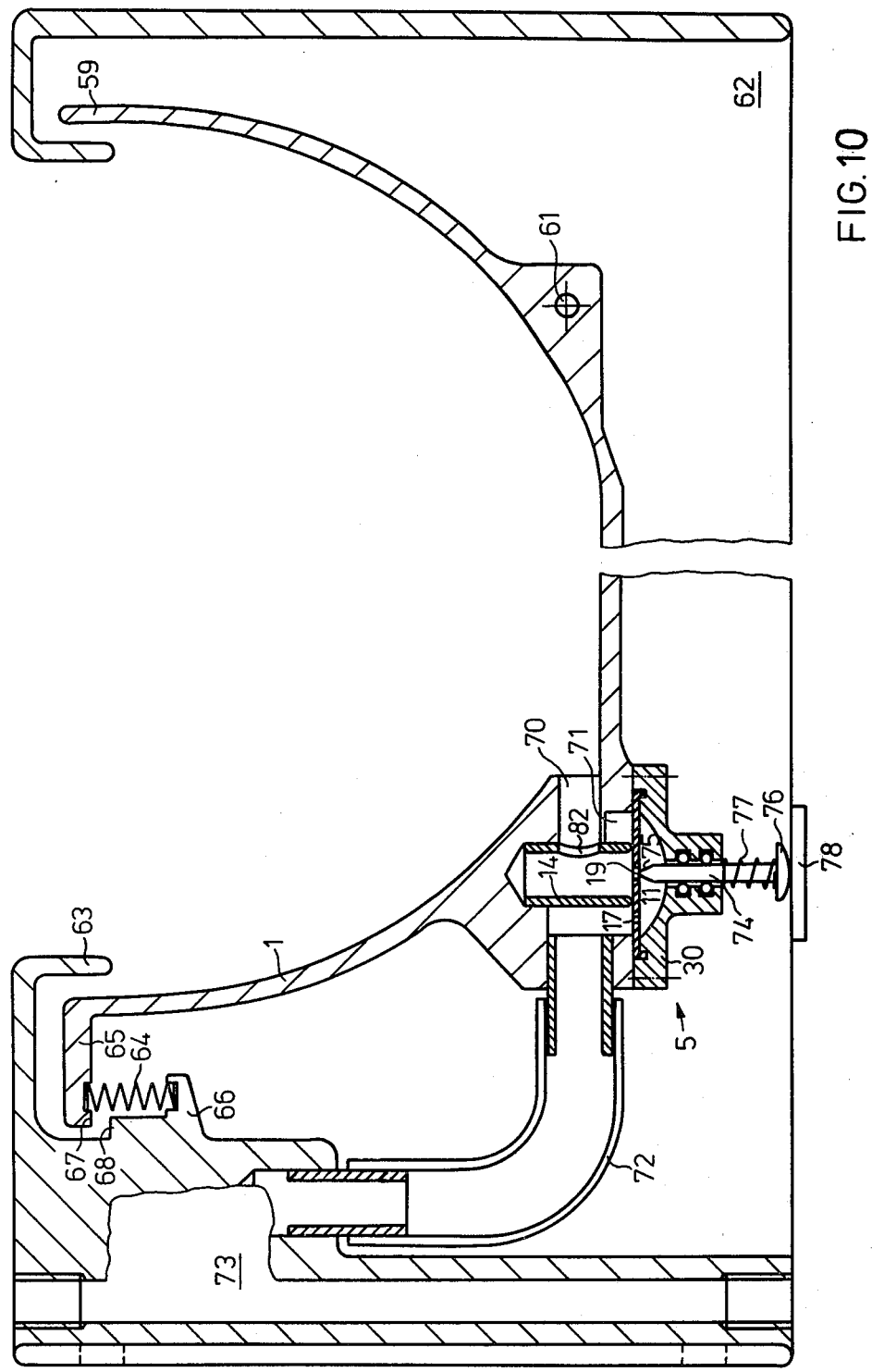
FIG. 10 is a view of a rocking bowl with a diaphragm valve thereon.

Lastly, it will be seen in FIG. 10 that the bowl 1 may be moved bodily about a turnpin 61 in a housing frame 62 and the inner edge 63 of the frame is designed so as to be turned inwards and down round the top edge 59 of the bowl. The bowl is acted upon by a compression spring 64 with a force in a clockwise direction, compression spring 64 being placed between a shoulder 65 on the bowl and a shoulder 66 on the housing frame, such shoulders furthermore having stops 67 and 68 for limiting the angle of rocking. The diaphragm valve 5 is, in this case, placed on the lower side of the bowl at a position spaced from the turnpin 61, barrel 14 being formed by a part placed in an upright hole into the material of the bowl, the inner space within the barrel 14 being joined up by way of a hole 70 with the space inside the bowl. The outer space 71 at the barrel 14 is, on the other hand, joined up by way of a hose 72 with a water inlet pipe 73 running through the housing frame.

In the cover 30, keeping the diaphragm's edge against the bowl, there is a pilot adjustment pin 74 which has two O-rings for sealing it and having a coned end 75 running into the middle opening of the diaphragm forming the outlet 19. This pilot control pin is forced by a coiled compression spring 77 (placed between the cover 30 and its head 76) against a rest 78 on the housing frame so that the pin 74 has the function of controlling the rate of motion of water from the inner space of the barrel 40 and the pilot control space 11 after the bowl 1 has rocked in relation to the fixed housing frame 62. The position of rocking is controlled by the condition of balance between, on the one hand the weight of the bowl and the water therein it and the return force of the compression spring 64 (and furthermore of the coiled compression spring 77) on the other hand. The balanced condition may, generally speaking, only be upset by taking water when an animal is watered, because there is generally no mechanical contact between the animal and the bowl because the inner edge 63 is fixed to the housing and is not moved. Because filling takes up at once, the liquid level is kept generally unchanged.

Figure 9:
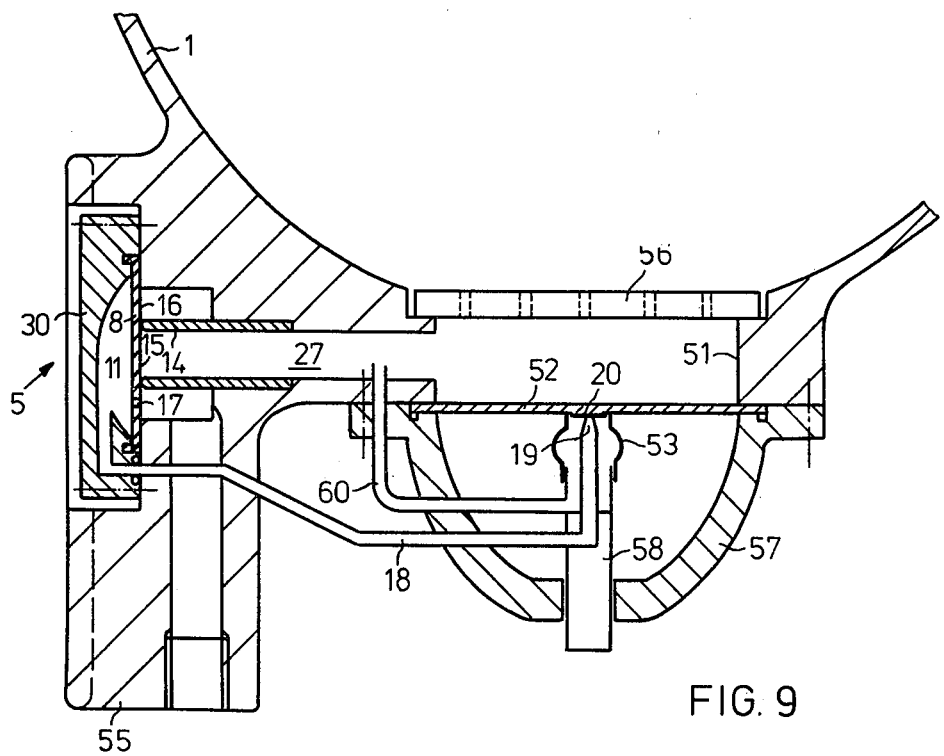
FIG. 9 is a view of a changed form of the design of FIG. 8 in which the diaphragm valve and the pilot diaphragm are separated from each other.
Figure 11:
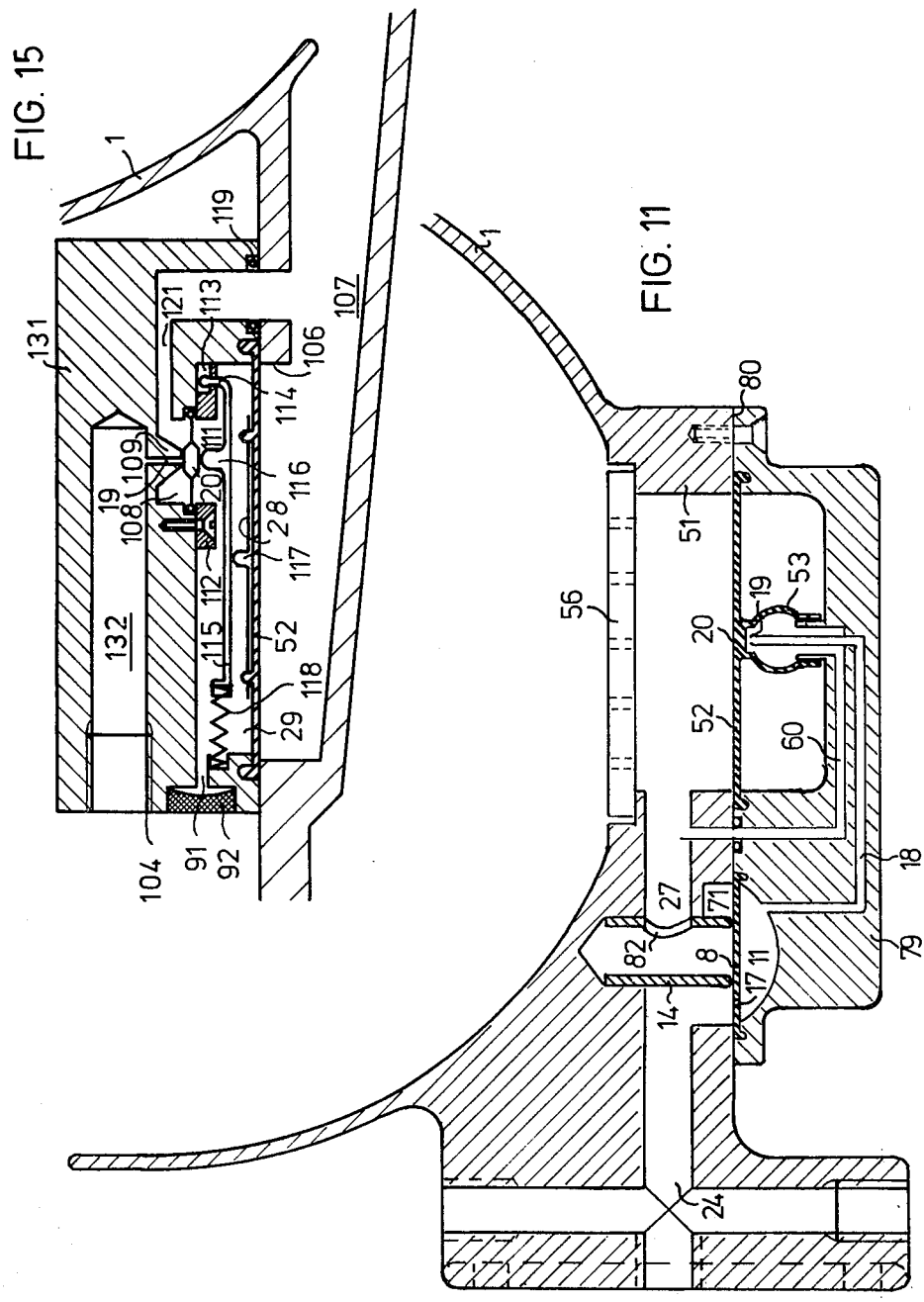
FIG. 11 is a section through a water unit with a pilot diaphragm and a valve diaphragm placed in a common plane.

In FIG. 11, having a pilot diaphragm 52 as in FIG. 9, valve diaphragm 8 is placed in the same plane as diaphragm 52 and is kept in position by a common cover 79 on the side of the bowl. Normal to the connection 27, the barrel 14 will be seen which, in this case as well, is in the form of a separate length of pipe fixed in a hole running upwards from the connection face 80 of the bowl, the lower end of barrel 14 having diaphragm 8 resting against it. The space within the barrel 14 is joined up by way of a hole 82 in the wall of the barrel with the opening 51 in the floor of the bowl, while the outer space 71, which is of greater diameter than the hole in which the top end of barrel 14 is placed, is joined up ba way of a hole (not numbered) with the pressure connection formed by hole 24.

Figure 12:
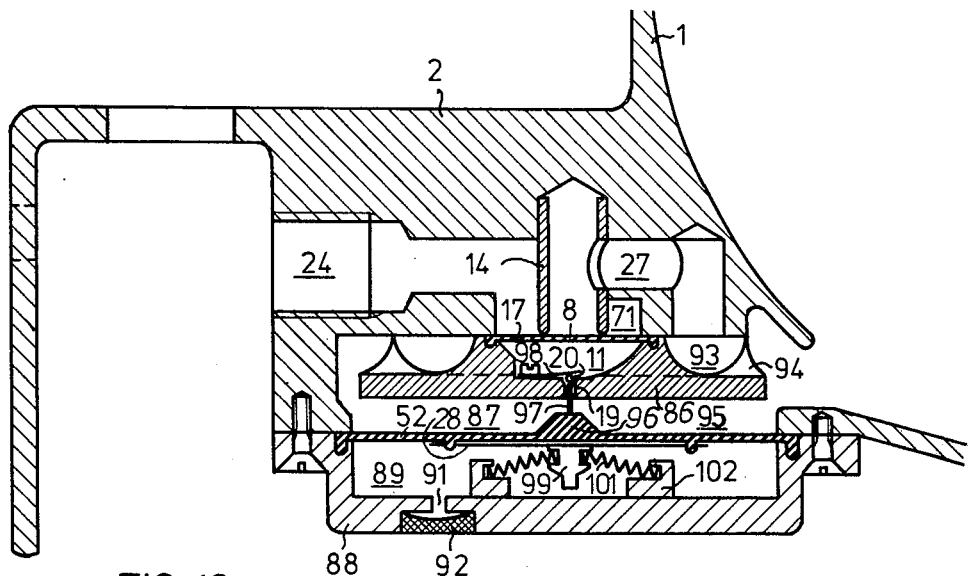
FIG. 12 is a view of a system in which the two diaphragms are parallel and centered on a common line normal thereto, under the back support part.

In FIG. 12 the valve diaphragm 8 is placed on generally the same lines as in FIG. 11 at the lower end of a back support by an inner cover 86, which is fixed to the support part 2, although this is not marked in the figure. Valve diaphragm 8 is placed in a pocket 87 covered over by the pilot diaphragm 52 which is centered on the same line as the other diaphragm. Pilot diaphragm 52 is reinforced by a metal plate 28. The edge of pilot diaphragm 52 is again fixed in position by a cover 88, screwed onto support part 2. Cover 88 is hollowed back under the pilot diaphragm at 89, such hollow spaced being joined up with the outside atmosphere by way of opening 91 so as to keep up atmospheric pressure. A filter plate 92 is placed in opening 91.

The connection 27 is, in this case, angled, it opening into a ring-like hollow 93 centered on the center of valve diaphragm 8 and molded into the top side of the inner cover 86, hollow 93 being joined up by radial openings 94 with the inlet space 95 formed between the two diaphragms and with the space inside bowl 1. With this design, the inlet space is frequently washed out by water and, for this reason, kept in good functioning order.

On the top side of the pilot diaphram 52 there is a coned button-like structure 96 as a reinforcement, structure 96 being joined with a pin 97 running upwardly at the axis of the diaphragm through outlet 19 formed in inner cover 86, the pin supporting at its free end a pilot valve 20 acted upon by leaf spring 98. On the lower side of pilot diaphragm 52, a further button 99 is fixed which is placed between two compression springs 101, acting oppositely and forming a sort of toggle lever system, the outer ends of the springs being supported by stops 102 fixed to cover 88. Taking it that the compression springs 101 are at an angle of about 15° to the plane of the diaphragm, an upwardly running force will be produced acting on the pin 97, such force acting oppositely to the release force, which is dependent on the water pressure, in the opening direction, that is to say opening outlet 19, and, for this reason, against any lifting of the valve diaphragm 8 in an upward direction. This gives the system a hysteresis or snap-action property or function to make certain that the valve is not turned on and off every time there is a small change in the water level, such operation of the valve being in fact dependent on the great change in level taking place.

Figure 13:
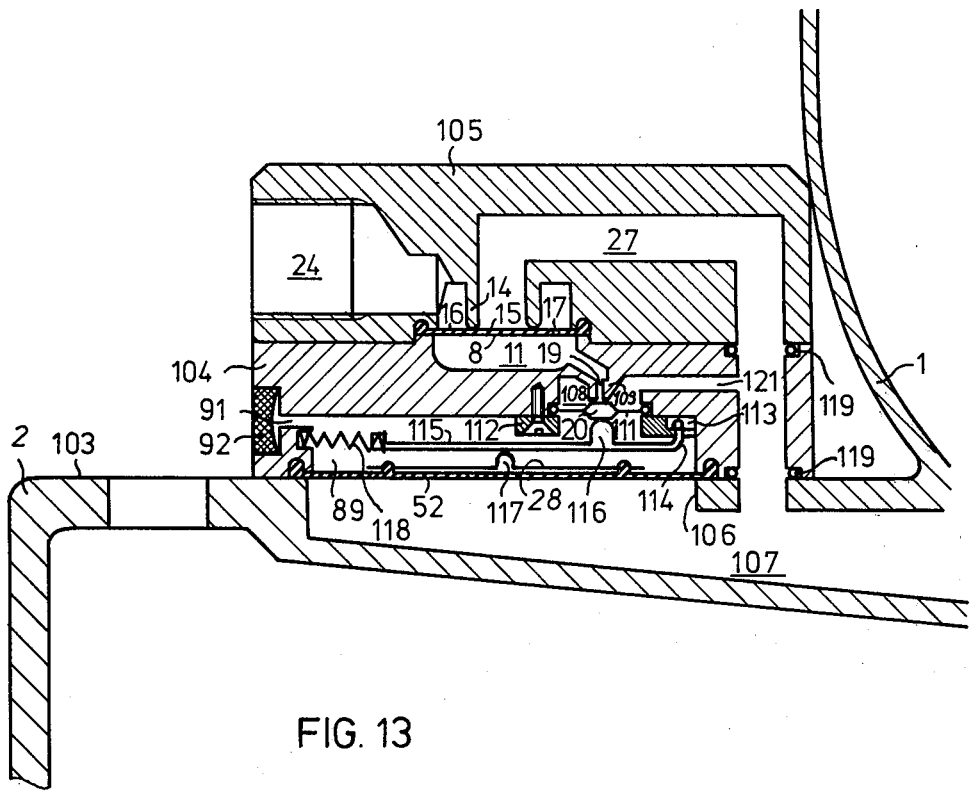
FIG. 13 is a view of a shut-in valve unit, on the same lines as that of FIG. 12, on the top side of the bowl support part.

In the case of the working example of FIG. 13, the support part 2 molded at the back of bowl 1 is joined up with a horizontal top wall 103, on which a connection plate 104 and an inlet plate 105 are positioned. The valve diaphragm 8 is water-tightly gripped between the two plates 104 and 105 and the edge of the pilot diaphragm 52 is kept in position by the connection plate 104 on the edge of a round opening 106, such opening being produced by molding the support part 2 and having an inlet connection running from it tangentially onto the floor of the bowl, such connection 107 having the function of an inlet space as in the design of FIG. 12. The two plates 104 and 105 are fixed by common screws to the support part 2.

Hollow 89 with the opening 91 and the filter plate 92 is produced by molding at a level higher than pilot diaphragm 52 in the lower part of connection plate 104. A cylindrical pocket 108 will be seen stretching upwards from the top of hollow 89 into connection plate 104. Within pocket 108 there is a coned male part 109 with outlet 19 within it, the outlet being joined up with the pilot space 11. The pilot valve 20 used with the outlet 19 is placed in the middle of a sealing diaphragm 111 shutting off pocket 108 and being water-tightly gripped at its edge over pocket 108 by way of a ring 112. Such ring 112 has a cutout at its edge to take the form of a step 113, the cutout taking up the angled end of a lever 115, the lever having a head 114 for forming the bearing system (113, 114) with step 113. Putting it differently, it may be said that the right hand edge of ring 112 is undercut at 113 and has a radial cutout in its edge which is wide enough for taking up an angled end part or neck 114 of the lever 115 so that such head is locked in position and the lever may not be pulled out of the radial cutout while, on the other hand, being free to be turned about its head. Lever 115 has a shoulder 116 resting against pilot valve 20 while, on the other hand, further to the left, lever 115 will be seen to be resting on a shoulder 117 molded on pilot diaphragm 52 at its middle. The free end of lever 115 will be seen to be acted upon by a compression spring 118 whose other end is at the edge of hollow 89, the spring generally being in line with the lever.

From the inside of the barrel 14, molded onto the inlet plate 104, connection 27 will be seen running to the inlet connection 107 through the gaskets 119 producing liquid-tight joins between plate 105, plate 104 and horizontal top wall 103. By way of a return connection 121, pocket 108 is joined up, over sealing diaphragm 111 with the connection 27.

Because the shoulders 116 (on the lever) and 117 (on the diaphragm 52) are at different distances from the bearing system 113, 114, lever 115 is firstly responsible for increasing the force acting on pilot valve 20, this force in the system of FIG. 13, being made twice as great. Furthermore, compression spring 118 is responsible for loading lever 115 in its resting position in a counter-clockwise direction and, for this reason, against the head of water acting upwards on pilot diaphragm 52. This loading force may be changed by changing the force of spring 118.

When the bowl is full of water, outlet 19 is shut off by pilot valve 20. When the water level goes down on an animal drinking, the head of water acting on the pilot diaphragm will be decreased as well so that it will be moved downwards out of its position so far, such downward motion being helped by compression spring 118, whose line of action is, in all cases, under the bearing in cutout 113 at the right hand end of the lever 115. When the water level in bowl 1 is under a lower level limit, the pilot valve 20 is moved clear of outlet 19 somewhat and, for this reason, filling is started by way of connection 27 and inlet connection 107. The filling operation only comes to an end when, on getting to the upper water level limit, pilot diaphragm 52 by way of lever 115 has the effect of shutting outlet 19 by way of pilot valve 20.

The valve anc control system does not, in all cases, have to be next to the bowl and it may, in fact, with a good effect, be placed at some vertical distance under the bowl if the water inlet pressure is high enough for making quick filling of the bowl possible. In fact, in this way, the pressure acting on a pilot diaphragm is increased by the vertical height difference so that regular control at a higher reaction speed is made possible. In fact, even in the case of a bowl as in FIG. 10, which may be moved, the valve does not have to be placed on the bowl and, in fact, may be positioned on the frame housing, while the pilot valve may be placed or supported on the moving bowl.

Figure 14:
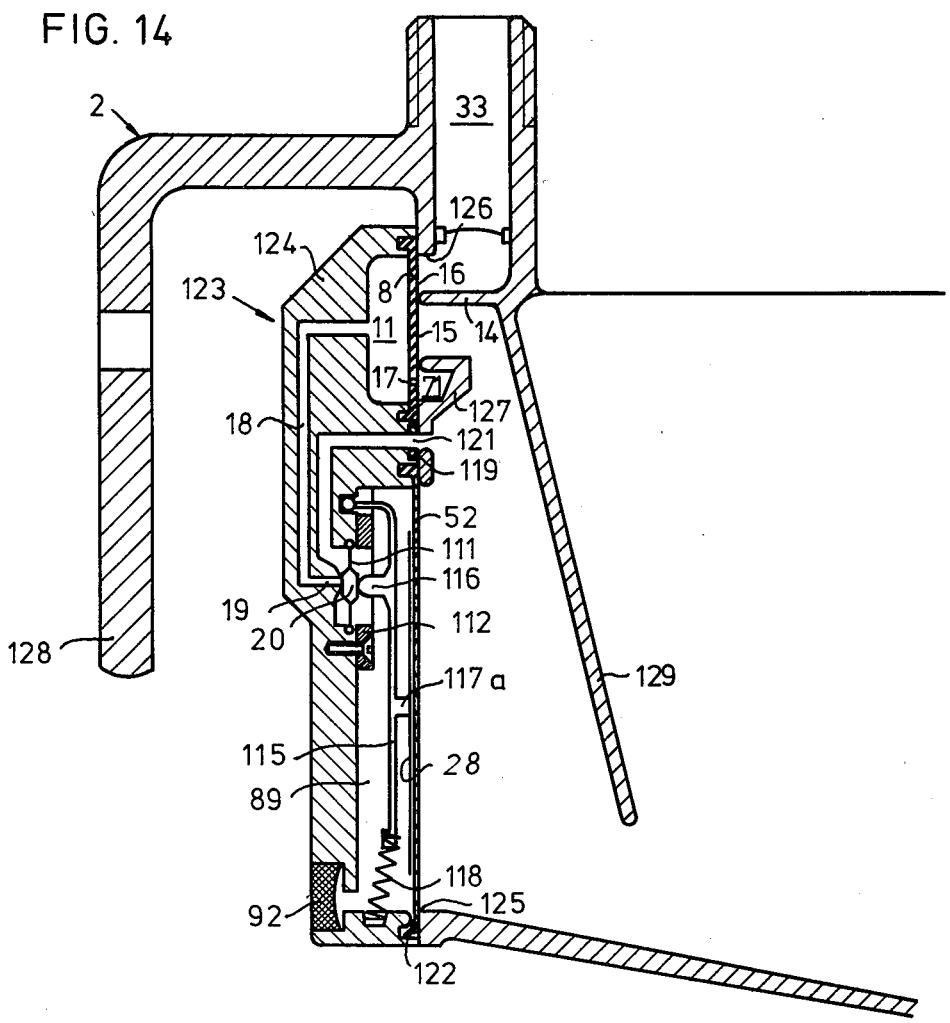
FIG. 14 is a view of a valve unit placed at the back wall of the bowl.

In FIG. 14 it will be seen that the back side of bowl 1 has a flat support face 122 against which the (edges of) pilot diaphragm 52 and the valve diaphragm 8 of a valve unit 123 are liquid-tightly fixed using a common valve housing 124 so that the two diaphragms 52 and 8 are placed vertically one above the other. The support face 122 has two diaphragm openings 125 and 126 made on molding the structure. The outer face 16 of the valve diaphragm 8 is furthermore resting against the barrel 14 and a half ring part 127 placed round the barrel and having a space 71 within it on the outer side of diaphragm 15. The parts 14 and 127 are molded in one piece on the bowl.

It will be seen that on the back side the valve unit is covered over by support plate 128 of support part 2, while, on the other hand, towards the inside of the bowl it is covered over by a guard plate 129 of the bowl. With respect to the placing of the diaphragms, this system is the same as that to be seen in FIG. 11 while, with respect to the design of the valve system, it is the same as FIG. 13. The useful effect with this design is that it makes do with the least possible number of parts and if one does not take into account the placing of the connections 18 and 121, in addition to the bowl, it is only necessary to make the valve housing 124, and the water makes its way straightway from the connection 33, molded on the bowl and then, from this position behind guard plate 129 to the floor of the bowl and, in this way, while keeping down the price of producing the system, very trouble-free operation is certain.

The connection with a single connection face 122 makes it specially simple in this case to have different valve units fixed on the bowl as may be desired. In fact, for example, one valve unit may be used which, in place of a pilot diaphragm, has a float or some other part to be worked by an animal, for the pilot valve, for example in such a way that the lever 115 is worked directly from a position in the bowl.

The different working examples of the invention may undergo many different changes and for example release (or trigger) levers and release buttons may be used, the one in place of the other as may be desired. In place of a plate-like pilot valve, it is possible to make use of a coned pilot valve, or the outlet 19 may be placed in cover 30 itself or in a wall covering the pilot pressure space. Many further different changes in the design may be made. In some special cases, it is further possible to have a release or trigger which may be rocked, or to make use of a hydraulic control system.

It is not necessary for the valve diaphram, a pilot diaphragm or a sealing diaphragm to be placed in the way given in the figures, that is to say horizontal or upright and, in fact, such parts may be put at any desired angle and be worked, in each case, in each of the two directions as dependent upon their positions. Furthermore, the two diaphragms do not have to be parallel to each other and, in fact, may be at any desired angle to each other.

More specially, a control system may be used which takes the form of the unit, complete in itself, on a common connection face of the bowl, the connection parts being able to be designed or a form of bowl with mechanical release or one with a self-acting release system, in the same way so that, as may be desired, the one or the other valve may be used.

So far the account of the invention has generally been limited to use in watering bowls for cattle. The bowl is, however, in no way limited to such a special use and, in fact, without any changes in many cases, may be used for watering the most different sorts of animals such as swine, poultry and the like.

Figure 16:
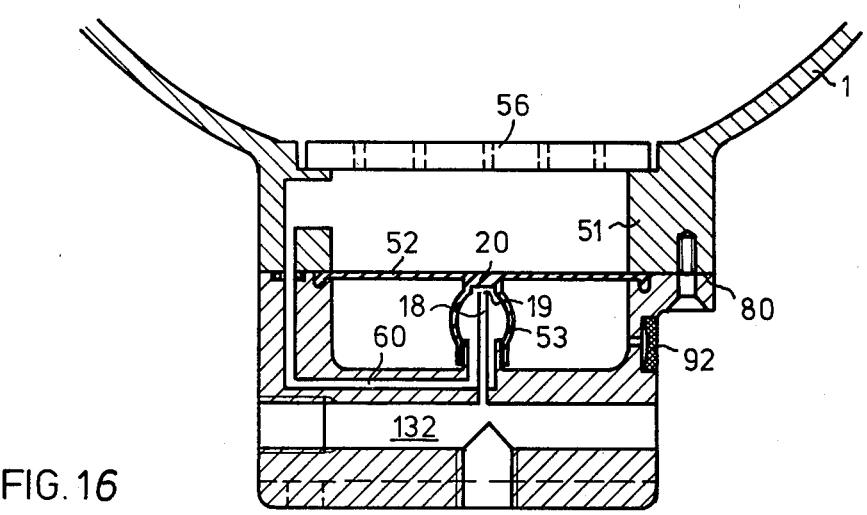
FIG. 16 is a view of a valve system, placed at the floor of the bowl, for watering small animals in which the control valve is worked by the pilot diaphragm itself.

Two watering units for small livestock may be seen in FIGS. 15 and 16 which are so designed that the pilot control system of the figures noted so far may, themselves, be used as control valves. To this end, in FIG. 15 the valve system is like that of FIG. 13 but, however, the outlet 10 of the pilot valve system of FIG. 13 is joined up itself with an inlet connection 132 formed in the valve housing 131. For this reason, it is possible for complete parts of systems as used in the watering units designed for large livestock to be used in systems for watering small livestock. The pilot valve 20 is, in fact, in the system of FIG. 15 used for controlling the input of water without any second valve as in FIG. 14. It is more specially in this case of FIG. 15 that a useful effect is produced by lever 115.

Using the same general teaching, the system of FIG. 9 may be changed on the lines of FIG. 16 in which the water makes its way directly through outlet 19 into the bowl and, for this reason, on the lower face of cover 791 has a T-like inlet connection 132 formed therein, from which water makes its way into the outlet connection 18 itself. It will be clear to the reader that, for example, the design of FIG. 14 may be changed on the same lines.

We claim:
1. An animal waterer comprising:
a bowl formed with an animal actuatable movable member;
a main valve connected to said bowl and having:
a housing,
a water inlet communicating with said housing,
a water outlet communicating with the interior of said bowl,
an annular wall separating said inlet from said outlet and having an annular edge,
a valve diaphragm in said housing spanned across said edge and defining in said housing a pilot space pressurizable to press said diaphragm against said edge and block communication between said inlet and said outlet, and
a first passage formed in said diaphragm communicating between said inlet and said space for enabling water from said inlet to pressurize said space and press said diaphragm against said edge;
means defining a throttle passage communicating between said space and through said outlet; and
a pilot valve operatively connected to said member and displaceable thereby for said throttle passage whereby actuation of said member by an animal enables throttled flow of water from said space through said throttle passage and said outlet into said bowl and relieves the pressure in said space whereby said diaphragm is displaced by the pressure of water at said inlet from said edge to permit water to flow past said edge from said inlet to said outlet, said throttle passage being a hole formed in said diaphragm, said pilot valve including a valve body disposed at said hole and biased to close said hole in the absence of displacement of said member.

2. The animal waterer defined in claim 1 wherein said hole is in the middle of said diaphragm.

3. The animal waterer defined in claim 2 wherein said pilot valve includes a driving rod connected to said body and running through said hole, said member being connected to said driving rod for longitudinal displacement thereof to operate said pilot valve.

4. The animal waterer defined in claim 3 wherein said body is a plate mounted on said driving rod and moved relative to said hole with said rod.

5. An animal waterer comprising:
a bowl formed with an animal actuatable movable member;
a main valve connected to said bowl and having:
a housing,
a water inlet communicating with said housing,
a water outlet communicating with the interior of said bowl,
an annular wall separating said inlet from said outlet and having an annular edge,
a valve diaphragm in said housing spanned across said edge and defining in said housing a pilot space pressurizable to press said diaphragm against said edge and block communication between said inlet and said outlet, and
a first passage formed in said diaphragm communicating between said inlet and said space for enabling water from said inlet to pressurize said space and press said diaphragm against said edge;
means defining a throttle passage communicating between said space and through said outlet; and
a pilot valve operatively connected to said member and displaceable thereby for said throttle passage whereby actuation of said member by an animal enables throttled flow of water from said space through said throttle passage and said outlet into said bowl and relieves the pressure in said space whereby said diaphragm is displaced by the pressure of water at said inlet from said edge to permit water to flow past said edge from said inlet to said outlet, said pilot valve being mounted on said bowl and spaced from said main valve, a pilot pipe connecting said space with said pilot valve.

6. An animal waterer comprising:
a bowl formed with an animal actuatable movable member;

a main valve connected to said bowl and having:
    a housing,
    a water inlet communicating with said housing,
    a water outlet communicating with the interior of said bowl,
    an annular wall separating said inlet from said outlet and having an annular edge,
    a valve diaphragm in said housing spanned across said edge and defining in said housing a pilot space pressurizable to press said diaphragm against said edge and block communication between said inlet and said outlet, and
  a first passage formed in said diaphragm communicating between said inlet and said space for enabling water from said inlet to pressurize said space and press said diaphragm against said edge;
  means defining a throttle passage communicating between said space and through said outlet; and
  a pilot valve operatively connected to said member and displaceable thereby for said throttle passage whereby actuation of said member by an animal enables throttled flow of water from said space through said throttle passage and said outlet into said bowl and relieves the pressure in said space whereby said diaphragm is displaced by the pressure of water at said inlet from said edge to permit water to flow past said edge from said inlet to said outlet, said housing being replaceably mounted on a connection face of said wall having at least one opening and said pilot valve is mounted on said wall, said pilot valve being a diaphragm valve, said housing including a cover for retaining the diaphragms of said valve in position against said wall.

7. The animal waterer defined in claim 6 wherein said pilot valve has a liquid controlling valve part separate from the pilot valve diaphragm and connected thereto by a lever.

8. The animal waterer defined in claim 7, further comprising a seal between a pilot valve diaphragm and an outlet from the pilot plate.

9. The animal waterer defined in claim 8 wherein the seal includes a sealing diaphragm, shutting off an air space of said pilot valve from the outlet thereof, said air space being connected to the atmosphere.

10. An animal waterer comprising:

a bowl formed with a movable member;
  a main valve connected to said bowl and having:
    a housing,
    a water inlet communicating with said housing,
    a water outlet communicating with the interior of said bowl,
    an annular wall separating said inlet from said outlet and having an annular edge,
    a valve diaphragm in said housing spanned across said edge and defining in said housing a pilot space pressurizable to press said diaphragm against said edge and block communication between said inlet and said outlet, and
    a first passage communicating between said inlet and said space for enabling water from said inlet to pressurize said space and press said diaphragm against said edge;
  means defining a throttle passage communicating between said space and through said outlet; and
  a pilot valve operatively connected to said movable member and displaceable thereby for said throttle passage whereby actuation of said member enables throttled flow of water from said space through said throttle passage and said outlet into said bowl and relieves the pressure in said water and said inlet from said edge to permit water to flow past said edge from said inlet to said outlet, said pilot valve being a diaphragm valve and having a liquid controlling valve part separate from the pilot valve diaphragm, said pilot valve being formed on one side of the pilot valve diaphragm with an air filled space connected to the ambient atmosphere.

11. The animal waterer defined in claim 6 wherein said diaphragms are disposed in a common plane and side by side on said bowl.

12. The animal waterer defined in claim 6 wherein said wall has a back wall with an outwardly turned face to which said main valve is secured and said inlet includes an upwardly running duct formed in said back wall part.

13. The animal waterer defined in claim 6, further comprising a pair of end-to-end compression springs formed as a toggle system acting upon the diaphragm of said pilot valve with a force decreasing with the bending of the pilot valve diaphragm out of a flat condition.

* * * * *